Oct. 12, 1948.　　　　　G. E. MILLER　　　　　2,451,348
ADJUSTABLE TRUNNION MOUNTING FOR BULLDOZERS AND THE LIKE
Filed March 15, 1945　　　　　　　　　　　　2 Sheets-Sheet 1
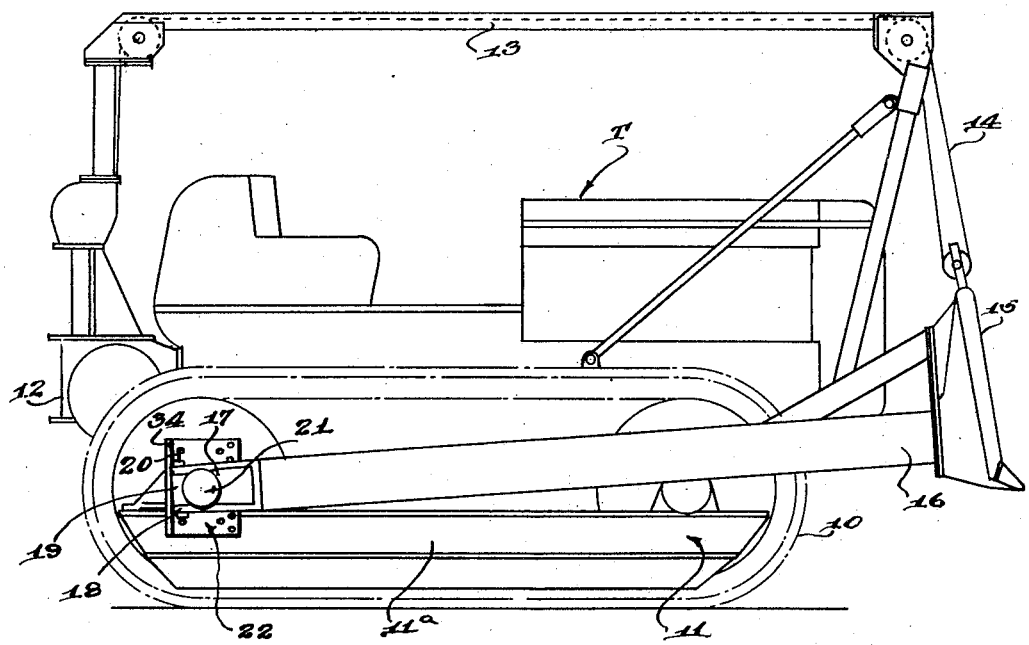
Fig. 1.
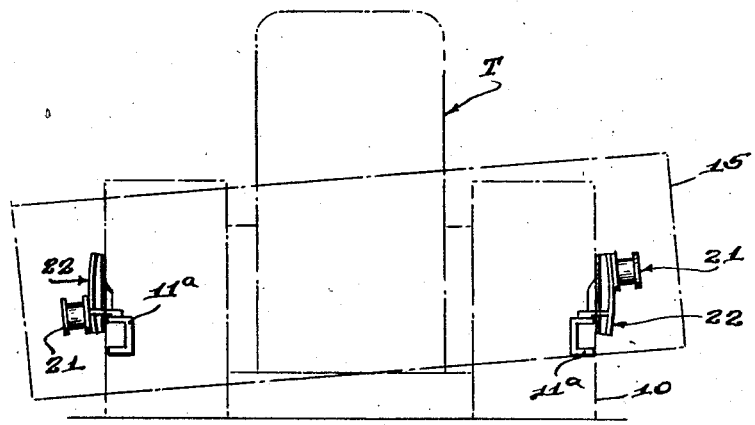
Fig. 2.
INVENTOR.
George E. Miller
BY
ATTORNEY Oct. 12, 1948.　　　　　　G. E. MILLER　　　　　　2,451,348
ADJUSTABLE TRUNNION MOUNTING FOR BULLDOZERS AND THE LIKE
Filed March 15, 1945　　　　　　　　　　　　　　　2 Sheets-Sheet 2
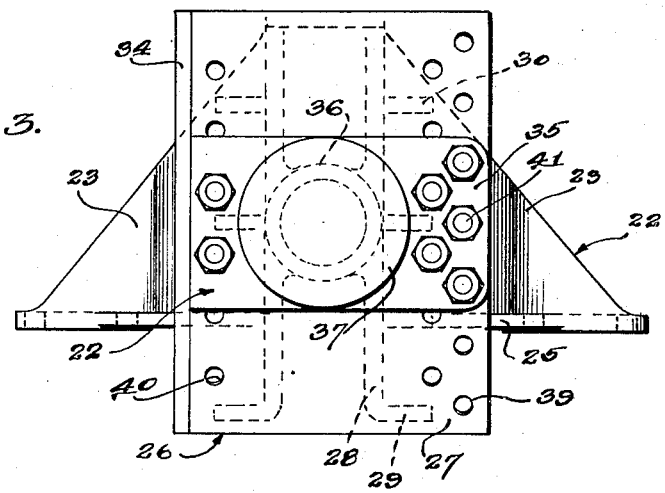
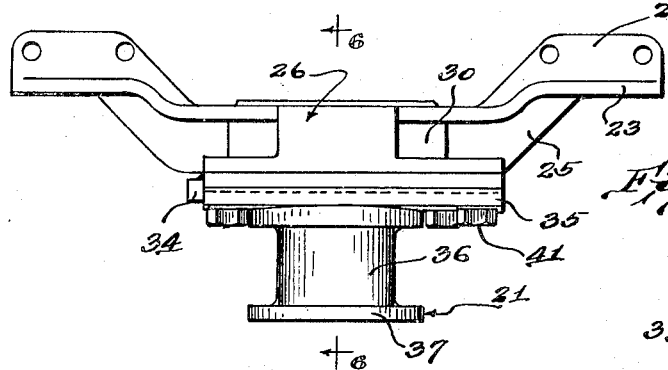
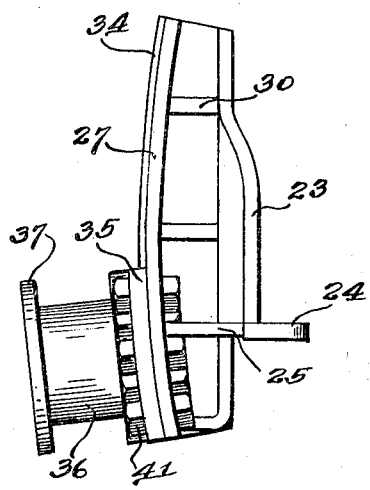
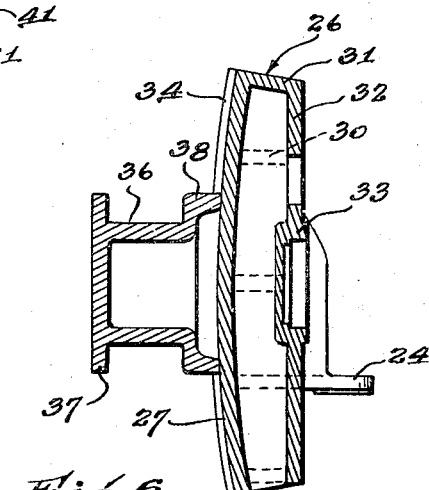
INVENTOR.
George E. Miller
BY
Malcolm W. Prosser
ATTORNEY Patented Oct. 12, 1948

2,451,348

UNITED STATES PATENT OFFICE 2,451,348

ADJUSTABLE TRUNNION MOUNTING FOR BULLDOZERS AND THE LIKE

George E. Miller, Findlay, Ohio, assignor, by mesne assignments, to Gar Wood Industries, Inc., Detroit, Mich., a corporation of Michigan Application March 15, 1945, Serial No. 582,929

3 Claims. (Cl. 37—144)

This invention relates to earth working equipment but more particularly to the mounting of the side arms of a mold board or scraper blade to the tractor.

An object is to produce a new and improved mounting for the rear or inner ends of the side arms of a mold board to the tractor in such manner that they may be readily and conveniently adjusted in an up and down direction and which is simple, sturdy and reliable in construction and design.

Other objects and advantages will hereinafter appear, and for purposes of illustration but not of limitation, an embodiment of the invention is shown on the accompanying drawings in which Figure 1 is a side elevation of a crawler mounted tractor equipped with a bulldozer blade or mold board and showing the mounting or attaching means for the rear end of the side arms;

Figure 2 is a diagrammatic view showing the adjustable trunnion mounts for the rear ends of the mold board side arms showing how one of the trunnion mounts may be in elevated position and the other one in lowered position;

Figure 3 is an enlarged elevational view of one of the trunnion mounts showing the supporting bracket and the adjustable trunnion mounted thereon, the same being shown detached from the track frame of the tractor;

Figure 4 is a top plan view of the assembly shown on Figure 3;

Figure 5 is an end elevational view of one of the trunnion mount assemblies showing the trunnion in its lowered position; and Figure 6 is a vertical sectional elevation substantially on the line 6—6 of Figure 4.

The illustrated embodiment of the invention comprises a tractor T which in this instance is mounted on the usual crawlers or endless belts which in turn are mounted on sprockets carried by a track frame 11. Ordinarily, the rear sprocket for the endless crawler belt is mounted on a shaft carried by the main frame of the tractor so that the front end portion of the track frame may rock independently of the main frame. At the rear end of the tractor is a suitable cable hoist 12, the cable 14 of which extends upwardly over suitable sheaves carried by an overhead guide 13, the forward end of the cable being attached to the mold board or scraper blade 15 disposed crosswise and slightly in advance of the front end of the tractor. As will be readily understood, push arms or side beams 16 are connected to opposite sides of the scraper blade and extend longitudinally of the tractor and on the outer side of the crawler units 10.

At the rear end of each push arm 16 is a bearing member 17 which terminates in a yoke portion 18 to receive therebetween a detachable bearing block 19 which is held in place by a bolt 20. The bearing assembly for each of the push arms 16 is pivotally mounted on a trunnion 21 carried by a bracket 22 fixed to the longitudinal beam 11a which forms a part of the frame for the track laying or crawler units. It will be understood that the construction and assembly is the same on opposite sides of the tractor so that detailed description of the trunnion mount on one side of the tractor is considered sufficient.

Particularly as shown in Figure 3, the bracket 22 is in this instance in the form of a one piece casting having a pair of substantially triangular side wings 23 having lateral flanges 24 provided with holes to enable the bracket to be bolted to the U beam 11a as indicated on Figures 1 and 2. Extending forwardly from each triangular wing portion 23 is a web 25 integral with a box-like structure 26 having a plate-like front wall 27 which is of substantial breadth and height, the lower portion extending below the ribs or webs 25 and having a gentle curvature in an up and down direction. It will be observed that the sides of the curved front wall 27 project laterally a substantial distance beyond the sides of the box-like portion 26. The sides of the structure 26 are formed by ribs 28 which are integral with the vertical portions of the wing portions 23. The lower ends of the ribs extend outwardly as indicated at 29 for further reenforcement of the lower portion of the plate-like wall 27.

A series of horizontally disposed ribs 30 are disposed on the outer sides of the vertical ribs 28 and afford integral connections between the wing portions 23 and the wall portion 27. A top wall 31 extends rearwardly from the upper edge of the front wall 27 and connects to a rear vertical wall 32 forming part of the box-like structure 26. In the intermediate portion of the rear wall 32 is a socketed portion 33 having a substantially cylindrical socket portion to fit over the adjacent axle for the rear crawler sprocket. Along the rear or left-hand edge portion (Figure 3) extends an abutment strip 34 which is welded to the plate as shown.

The trunnion 21 comprises a casting consisting of a substantially rectangular plate 35 of substantially the same width as the curved plate surface 27 so that an edge portion thereof abuts against the inner face of the abutment strip 34. As shown on Figure 5, the plate 35 has a curvature conforming to that of the plate 27 so as to fit closely thereagainst in any position of vertical adjustment. Arranged centrally of the plate 35 and projecting outwardly therefrom is a cylindrical box or trunnion 36 having an annular end flange 37. At the inner end of the cylindrical trunnion 36 is a shouldered portion 38 of substantially the same diameter as the terminal flange 37. Manifestly the bearing 17 on the inner end of the respective push arm 16 fits the trunnion 36 between the shoulder 38 and flange 37 in such manner that it may rock relatively thereto during the raising and lowering movements of the mold board 15.

Formed in the right-hand side (Figure 3) of the bracket plate surface 27 is a series of bolt receiving apertures 39 which are arranged in pairs in staggered relation and on the left-hand side of the plate 27 is a series of apertures 40, in this instance a single row of apertures. The trunnion plate 35 is likewise provided with bolt receiving apertures, those on the right side being arranged in staggered relation and a single row being provided on the left-hand side. This enables bolt and nut assembly 41 to be inserted through registering apertures in order securely to fasten the trunnion plate 35 to the bracket plate 27. Since the thrust from the side arms 16 imposes a greater force on the bolt and nut assemblies on the right hand side of the trunnion plate, a greater number is employed on that side. This arrangement enables the trunnion to be adjusted vertically upwardly or downwardly in small increments thus enabling a very slight or sizable adjustment to be effected.

The curvature of the plate as well as the trunnion plate 35 is such as to enable one of the trunnions 21 to be swung upwardly and the other downwardly as indicated in Figure 2. By adjusting the trunnions in this manner, it will be manifest that one side edge of the mold board 15 may be raised above the opposite side edge. Thus this adjustment makes possible the positioning of the mold board either straight across or tilted in one direction or the other in accordance with the demands of service.

It is to be understood that numerous changes in details of construction, arrangement and operation may be effected without departing from the spirit of the invention especially as defined in the appended claims.

What I claim is:

1. A bulldozer comprising rigid spaced side beams, a rigid blade support to which the side beams are connected at their forward ends, means for pivotally connecting the beams at their rear ends to the side frames of a tractor, said connecting means including a single bearing member on each side beam, a trunnion for receiving each bearing member, and a mounting for each trunnion adapted to be secured to the adjacent side frame of a tractor and enabling the trunnion to be selectively adjusted in a vertical direction to one of a number of positions, said mounting being curvilinear in a vertical direction thereby to enable the axis of the trunnion to be inclined in accordance with the vertical adjustment.

2. A bulldozer comprising rigid spaced side beams, a rigid blade support to which the side beams are connected at their forward ends, means for pivotally connecting the beams at their rear ends to the side frames of a tractor, said connecting means including a single bearing member on each side beam, a trunnion for receiving each bearing member, a plate rigid with said trunnion and having a face curved in a vertical direction, a bracket adapted to be secured to the adjacent side frame of the tractor having a vertically disposed plate against which said trunnion plate abuts, said bracket plate being curved to conform to the curvature of said trunnion plate, thereby to incline the axis of the trunnion in accordance with the vertical movement of one plate in relation to the other, said plates having a plurality of apertures adapted selectively to be brought into registration for adjusting the position of the trunnion in a vertical direction, and bolts for securing said plates in adjusted position.

3. A bulldozer comprising rigid spaced side beams, a rigid blade support to which the side beams are connected at their forward ends, means for pivotally connecting the beams at their rear ends to the side frames of a tractor, said connecting means including a single bearing member on each side beam, a trunnion on the adjacent side frame receiving said bearing member, a plate rigid with said trunnion, a bracket on the adjacent side frame of the tractor having a vertically disposed plate against which said trunnion plate abuts, said plates having a plurality of apertures adapted selectively to be brought into registration for adjusting the position of the trunnion in a vertical direction, said apertures being disposed on opposite sides of the trunnion with a greater number at the forward side than at the rearward side thereof, and bolts for securing said plates in adjusted position.

GEORGE E. MILLER.

REFERENCES CITED

The following references are of record in the file of this patent:

UNITED STATES PATENTS

| Number | Name | Date |
|---|---|---|
| 1,704,475 | Heinzen | Mar. 5, 1929 |
| 2,126,791 | Low | Aug. 16, 1938 |
| 2,157,311 | Walch | May 9, 1939 |